United States Patent [19]

Nisar

[11] Patent Number: 5,673,419

[45] Date of Patent: Sep. 30, 1997

[54] PARITY BIT EMULATOR WITH WRITE PARITY BIT CHECKING

[75] Inventor: Ashraf Nisar, Anaheim, Calif.

[73] Assignee: Simple Technology, Incorporated, Santa Ana, Calif.

[21] Appl. No.: 444,963

[22] Filed: May 19, 1995

[51] Int. Cl.[6] ................................ G06F 11/10
[52] U.S. Cl. ........................................ 395/500
[58] Field of Search .................... 395/500, 575, 395/375; 364/578, 738; 371/40.1, 51.1

[56] References Cited

U.S. PATENT DOCUMENTS

| | | | |
|---|---|---|---|
| 4,005,405 | 1/1977 | West | 371/40.1 |
| 5,218,691 | 6/1993 | Tuma et al. | 395/500 |
| 5,355,377 | 10/1994 | Venkidu et al. | |
| 5,367,526 | 11/1994 | Kong | 371/51.1 |
| 5,477,553 | 12/1995 | Kong | 371/51.1 |

*Primary Examiner*—Kevin J. Teska
*Assistant Examiner*—Dan Fiul
*Attorney, Agent, or Firm*—Knobbe, Martens, Olson & Bear, LLP

[57] ABSTRACT

A computer system includes a parity bit emulator circuit which generates a parity bit to be associated with a data byte output by a signal in-line memory module (SIMM) to a CPU. Each parity bit emulator monitors four consecutive write cycles to determine whether the system parity is even or odd, and thereafter monitors each write cycle to determine if a data transfer error has occurred during a write from the CPU to the SIMM. A state machine circuit provides appropriate timing for write and read cycle memory access protocols.

19 Claims, 8 Drawing Sheets

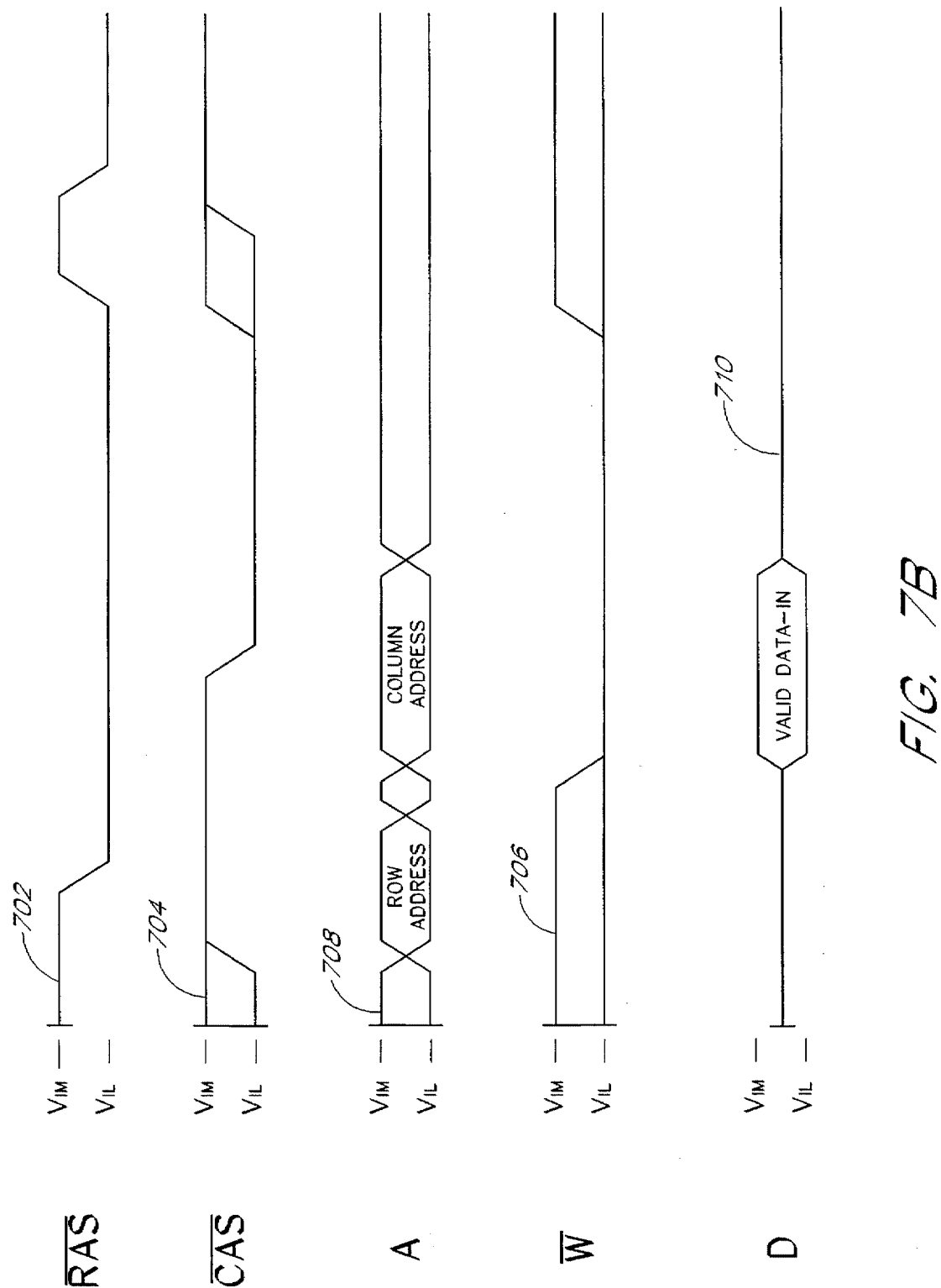

# 5,673,419

PARITY BIT EMULATOR WITH WRITE PARITY BIT CHECKING

BACKGROUND OF THE INVENTION

1. Field of the Invention

The present invention relates to memory modules, and in particular, to memory modules which emulate storing and retrieving of a parity bit from memory.

2. Description of the Related Art

Conventional computer systems such as personal computers (P.C.s) and work stations, include one or more central processing units (CPUs) connected to one or more dynamic random access memory modules (DRAMs). Because of the very large size of such DRAMs, even a small error rate could cause serious operating failures. Thus, in an effort to prevent operating failures, error detection and correction methods have been employed in past computer systems using DRAM memories to detect errors in these systems.

Personal computers such as the IBM AT and compatibles, have included error detection in the form of parity. A parity bit is an extra bit appended to the end of each byte of data which contains information about the data within that byte. Specifically, if an even number of "1" bits is counted within a given byte, then the parity bit will be set to true (i.e., the parity bit will be set to 1). If an odd number of "1" bits is counted within the byte of data, then the extra parity bit is set to false (i.e., the parity bit is set to 0). This form of data redundancy is known as even parity wherein an even number of 1's produces a parity bit equal to 1 and an odd number of 1's produces a parity bit which is set to 0. A second type of parity, commonly referred to as odd parity, sets the parity bit to 1 if an odd number of 1 bits is counted within the data bit, and sets the parity bit to 0 if an even number of 1 bits is counted in the data byte. Since the two types of parity are mutually exclusive, an even parity generator will always output the opposite, or inverse logic value, than an odd parity generator would output when the same data word is contained within the data byte.

In these previous systems, when 8 bits of data were written to the DRAM, a parity bit was generated for the byte of data and stored as a 9th bit within the DRAM array. Thus, DRAM is arranged to store 9-bit data words wherein 8 of the bits are actual data and the 9th memory location is used for storing the data parity bit. When data is read from the DRAM, the 8 data bits are input into a parity checker, which computes the parity and then compares it to the parity bit which was previously stored in the 9th bit location in the DRAM array. When the parity checker finds that the parity bit does not match the previously stored parity bit, a parity error is detected, and an error signal or an interrupt is sent to the main CPU. This prevents the error from being propagated so that important system files are not damaged.

Recently, DRAM chips have become an increasingly reliable so that DRAM errors are much less common than in earlier chips. In fact, errors are presently so infrequent that most computer systems are able to function efficiently without parity bit error detection at all. It is thus desirable to eliminate the 9th data bit since the value of parity checking is minimal, while the 9th data bit takes up approximately an extra 12% of memory space. Therefore, newer systems have not included memory space which is allocated for storage of parity bits.

Specifically, a very large number of AT compatible computers are now being built using single in-line memory modules (SIMMs). Such single in-line memory modules are well known in the art (see for example U.S. Pat. No. 4,656,605, which is hereby incorporated by reference). Previous SIMM's were built to include 9 memory chips mounted in a row wherein each memory chip stores a data bit out of a byte of data with the last memory chip storing the parity bit.

In order to eliminate the cost of producing a 9th memory chip which stores the parity bit within a 9-bit SIMM, a simple solution would be to manufacture only an 8-bit wide SIMM. However, simply using an 8-bit wide SIMM is impractical because such devices are physically incompatible with mother boards on previous systems which expect to receive a parity bit from the memory module each time data is read from the DRAM (i.e., the SIMM). Thus, some of the new DRAM modules have included a parity bit generator, or emulator, which generates a 9th parity bit each time data is read from the DRAM. This parity bit emulator receives each of the 8 data bits in a given byte and determines the parity based on the number of 1's present within the read data byte. In this manner, the cost of an extra memory chip is eliminated, while at the same time compatibility between the newer memory modules and the previous mother boards which expect a parity bit is retained.

Although such parity bit emulator devices have been found to be advantageous in many systems, there still exists a number of limitations to present devices. For example, if an error does occur within a memory transaction, it is difficult to determine at which point in the memory transaction the error was produced (e.g., during the write cycle, during the read cycle, across the system bus, or in the memory module).

SUMMARY OF THE INVENTION

A parity bit emulator operates within a computer system having a memory, wherein a transfer of data to the memory constitutes a data write, while a transfer of data from the memory constitutes a data read. The emulator comprises a plurality of data inputs which are configured to receive data bits provided by the computer system. The emulator further includes parity bit generation circuitry. The parity bit generation circuitry has inputs which connect to the data inputs, and an output which provides an emulated parity bit in response to the application of the data to the data inputs during a read cycle. The emulator also includes a parity bit input which receives a parity bit associated with the input data bits during a write cycle. Finally, the parity emulator includes a parity error determination circuit which receives the parity bit and an output of the parity bit generation circuit during a write cycle. The parity error determination circuit further compares the input parity bit and the output of the parity bit generation circuitry to provide an error signal if the input parity bit is different than the output of the parity bit generation circuitry.

Under another aspect, the invention is a method of emulating a parity bit within a computer system. The computer system has a memory and a predetermined system parity type. Parity bits associated with corresponding sets of data within the computer system are consistent with the system parity type. Within the computer system, transfers of data to the memory are designated as write cycles and transfers of data from the memory are designated as read cycles. The method of the invention comprises the steps of monitoring data sets, together with parity bits associated with the data sets, transferred during multiple monitored write cycles; setting a system parity type of a parity emulator when the multiple monitored write cycles have the same parity type;

observing data sets transferred during read cycles; generating a parity bit consistent with the system parity type to be associated with each observed data set; observing data sets, together with parity bits associated with the data sets, transferred during write cycles; and generating an error signal when the monitored data sets have an associated parity bit which is not consistent with the system parity type of the parity emulator.

A further aspect of the invention is a computer system comprising a central processor unit (CPU) and a memory unit, where the CPU and the memory unit exchange data during read and write cycles. At least some of the data is parity encoded in accordance with a pre-defined system parity type. The computer system also includes a parity emulation circuit which connects with the memory unit to receive data transferred from the memory unit during read cycles and to the memory during write cycles. The parity emulation circuit is configured to generate a parity emulation bit consistent with the system parity type during read cycles, and to monitor a parity bit associated with data received during write cycles to determine if the parity bit is consistent with the system parity type.

Under another aspect, the present invention is a parity bit emulator which operates within a computer system. The computer system has a memory and a predetermined system parity type. The emulator comprises a plurality of data inputs which are configured to receive data provided by the computer system. The emulator also includes parity bit generation circuitry having inputs which connect to the data inputs and an output which provides an emulated parity bit in response to the application of the data to the data inputs. In addition, a system parity determination circuit is included within the parity emulator. The system parity determination circuit monitors parity bits associated with data written to the memory during multiple write cycles, and outputs a parity set signal when the multiple monitored write cycles are determined to have the same parity type. The system parity determination circuit also receives parity data in subsequent write cycles, after the parity set signal has been generated, without changing the parity set signal. Finally, the parity emulator includes a system parity set circuit in communication with the parity bit generation circuitry. The system parity set circuit receives the parity set signal to cause parity bits generated by the parity emulator to have the same parity type, such as even or odd, as the parity bits monitored in the multiple write cycles.

Under a still further aspect, the invention is a method of generating an interrupt to a central processing unit (CPU). The CPU checks parity data associated with information transferred to the CPU, and generates an interrupt when erroneous parity data is associated with the information transferred to the CPU. The method comprises the steps of detecting a parity error in data transferred during a write cycle; and generating intentionally erroneous parity data to be associated with data transferred during a read cycle.

BRIEF DESCRIPTION OF THE DRAWINGS

FIGS. 7A and 7B are timing diagrams which represent the relative timing amongst the memory accessing signals used to access the SIMM of FIGS. 1 and 2 during read and write cycles respectively.

DETAILED DESCRIPTION OF THE PREFERRED EMBODIMENT

Figure 1:
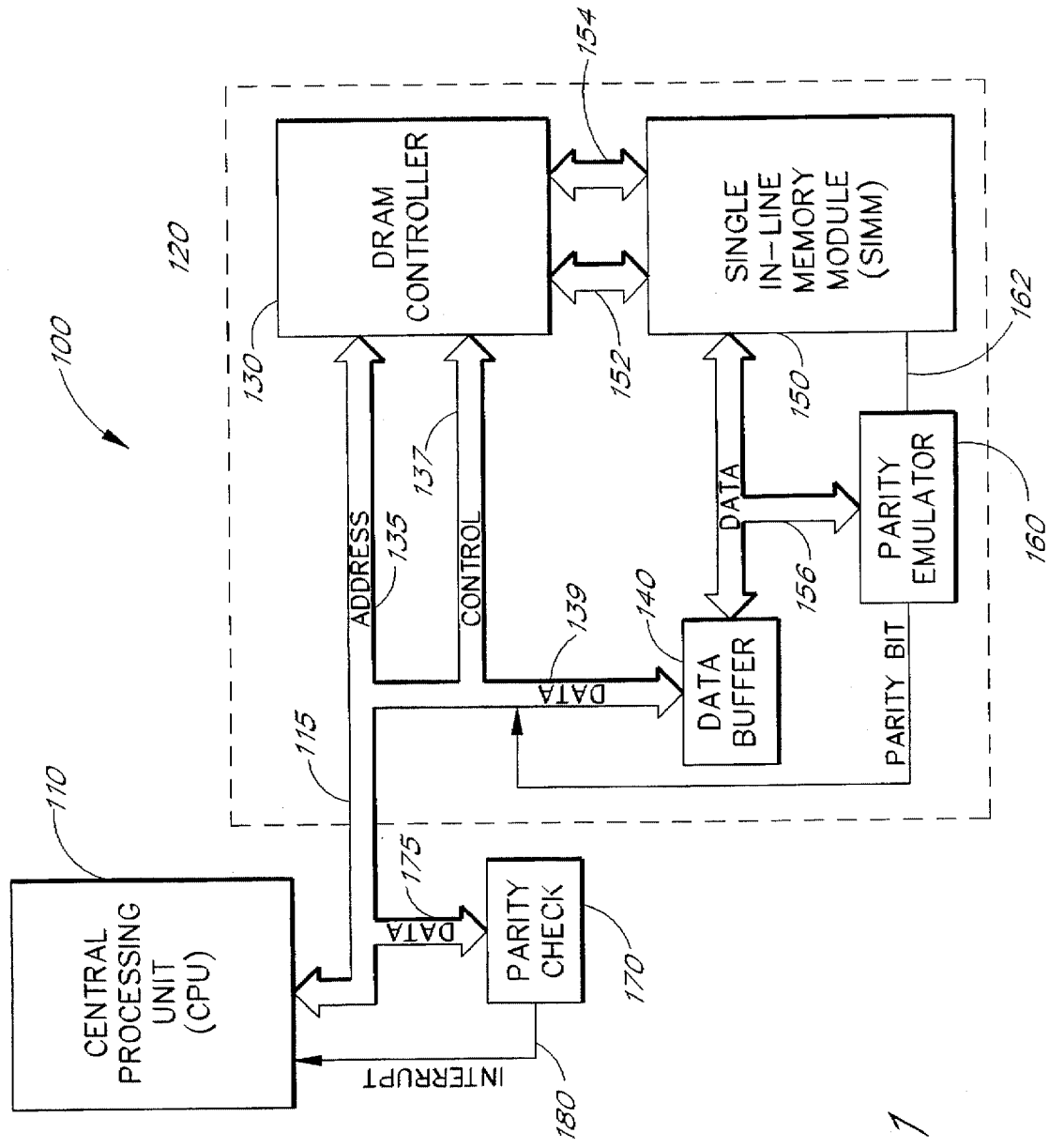
FIG. 1 is a simplified schematic block diagram showing some of the main structural and functional elements within a personal computing system.

FIG. 1 is a simplified schematic block diagram of a computer system 100. As shown in FIG. 1, the computer system 100 includes a central processing unit (CPU) 110 which connects to a memory card 120 via a system bus 115. For example, the CPU 110 may comprise an Intel 486 processing chip or a pentium (P5) processor chip also produced by Intel. The system bus 115 may, in one embodiment, comprise a small computer system interface (SCSI) bus which transmits address, control, and data signals as well understood in the art. It should, of course, be understood that the computer system 100 may also include an input/output module as well as additional CPUs or memory cards, all of which are well known in the art but not shown for purposes of simplicity of illustration of the preferred embodiment.

The memory card 120 includes a dynamic random access memory (DRAM) controller 130 which receives address and control information via an address bus 135 and a control bus 137. Data from the bus 115 enters a buffer 140 via a data bus 139. The DRAM controller 130 connects to a single inline memory module (SIMM) 150 via address and control buses 152, 154, respectively. The SIMM 150 receives data from the data buffer 140 via a data bus 156. The data bus 156 as well as the address, control and data buses 135, 137, 139, respectively, are bi-directional buses as is the system bus 115. The address and control buses 152, 154 from the DRAM controller to the SIMM 150 are unidirectional data buses.

A parity emulator 160 also connects to the bi-directional data bus 156. The parity emulator 160 receives control signals from the SIMM 150 via a bus 162 and outputs a parity bit via a line 165 included within the data bus 139 and the system bus 115.

On the motherboard, a parity check circuit 170 receives data inputs via a data portion 175 of the system bus 115, and outputs an interrupt signal to the CPU 110 via an interrupt line 180. Typically, the generation of an interrupt by the parity check circuit 170 causes the CPU to "hang up" so that the system must be rebooted. It should be understood that, although the interrupt line 180 is depicted in FIG. 1 as being separate from the system bus 115, in fact the interrupt line 180 constitutes a portion of the control lines incorporated within the system bus 115 and has simply been depicted here as separate from the system bus 115 in order to more clearly illustrate the operation of the preferred embodiment.

In operation, the central processing unit 110 accesses the memory card 120 via read and write operations over the system bus 115. Specifically, when the CPU 110 initiates a write cycle, data, address, and control signals are transmitted out from the CPU 110 to the memory card 120 via the system bus 115. Address and control data are transmitted to the DRAM controller 130 via the buses 135, 137, respectively, while the data transmitted via bus 115 is provided as an input to the data buffer 140 via the data bus 139.

Based upon the address and control data input to the DRAM controller 130, the DRAM controller 130 generates accessing signals which are used to access memory locations within the SIMM 150 via the address and control buses 152, 154. As will be described in greater detail below, the address bits received by the DRAM controller 130 via the address bus 135 are divided into row and column portions which are sequentially provided as an input to registers within the SIMM 150. In this manner, a memory location is designated within a memory array by both row and column address data. Furthermore, memory accessing signals are transmitted to the SIMM 150 via the control bus 154. As will be discussed in greater detail below with reference to FIG. 2, these memory accessing signals include a row address strobe (RAS) signal, a column address strobe (CAS) signal, and a write enable (WE) signal. These memory accessing signals are used to establish the timing which is used to access each of the memory locations within the SIMM 150.

Once the SIMM 150 has received the appropriate commands from the DRAM controller 130, data is transmitted (in a write cycle) from the data buffer 140 into the SIMM 150 at the designated memory locations via the data bus 156. In this manner, data from the CPU 110 is written to specified memory locations within the SIMM 150 of the memory card 120.

In systems which employ parity generators or emulators, it is important to determine upon initialization whether the particular system is an even parity or an odd parity system. Thus, some previous parity emulators monitored each and every write cycle from the processors to the memory to determine whether the system parity is even or odd. Specifically, prior parity emulators would determine a number of 1's within a given data byte and then check the parity bit to determine the system parity. For example, if four 1's are found within the initial data byte written to the memory, and the parity bit is also a 1, then the parity emulator will determine that the system is running on even parity and will consequently emulate parity bits in accordance with even parity format. The parity emulator of previous systems would perform this system parity setting at the occurrence of each write cycle, so that if an erroneous parity bit is detected during a write cycle, the system parity setting will be incorrect. Thus, an erroneous parity bit could be emulated in the subsequent read cycle.

In accordance with the preferred embodiment, however, the parity emulator 160 does not set its own parity emulation based on the system parity until four consecutive write cycles of the same parity have been monitored, and furthermore, the parity emulator 160 continues to monitor each write cycle from the CPU 110 to the SIMM 150 so as to provide for more accurate monitoring of data errors which may occur during a write from the CPU 110 to the memory module 150. The operation of the parity emulator 160 when the parity emulator 160 monitors write cycles from the CPU 110 to the SIMM 150 will be described in greater detail below with reference to FIGS. 3–5.

When the CPU 110 initiates a read cycle, only address and control signals are transmitted via the bus 115 to the DRAM controller 130 so the data signals are not transmitted to the data buffer 140 as with a write cycle. The DRAM controller 130 accesses the SIMM 150 at the designated address so that data is output from the SIMM 150 to the data buffer 140 via the bus 156. This data is then written from the buffer 140 to the CPU 110 via the bus 139 and the system bus 115. In addition, the motherboard expects a parity bit to be output by the SIMM 150 for each data byte that is read from the SIMM 150. However, since the SIMM 150 does not include a memory chip for storing parity bits, the parity emulator 160 generates the appropriate parity bit (based upon the earlier determined system parity) and outputs this parity bit to the parity check circuit 170 via the system bus 115. Thus, for each byte of data read from the SIMM 150, a parity bit is generated by the emulator 160, and this parity bit is received by the parity check circuit 170 on the motherboard.

The parity check circuit 170 further receives the data which is written out via the bus 156 so that the parity check circuit 170 is able to determine that the appropriate parity bit is associated with the output data byte. The parity check circuit 170 determines whether or not the parity bit associated with a given data byte was is the correct parity bit. If the detected parity bit is not the correct parity for the input data byte, then the parity check circuit 170 generates an interrupt which is transmitted to the CPU 110 via the interrupt line 180.

In this manner read and write cycles are fully compatible between the memory card 120 having the SIMM 150 without a parity chip and the CPU 110 having a motherboard which expects to receive parity bits output from the memory card 120.

Figure 2:
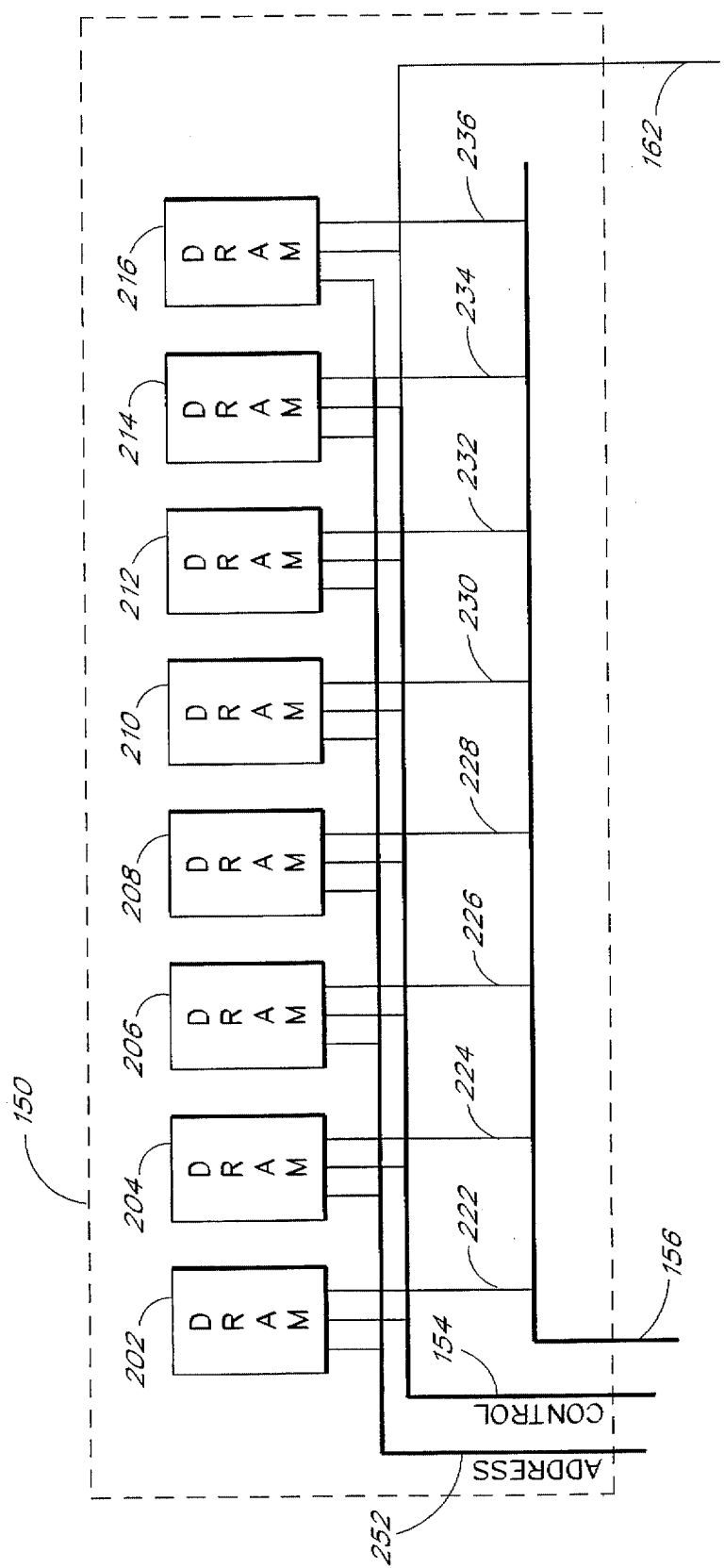
FIG. 2 is a schematic block diagram showing the main internal elements of a single in-line memory module (SIMM) as depicted in FIG. 1.

FIG. 2 is a schematic block diagram showing the main internal components of the SIMM 150. The SIMM 150 is shown in FIG. 2 to contain eight DRAM memory chips 202–216. Each of the DRAM chips 202–216 advantageously comprises a 1M×4-bit, high speed, CMOS DRAM available from SAMSUNG and sold under Model No. KM44C1000BSL. Address signals for accessing memory locations within each of the DRAM memories 202–216 are provided via the address bus 152, while control signals including the CAS, RAS, and WE signals are provided to each of the DRAM chips 202–216 via the control bus 154. Furthermore, these control signals are output from the SIMM 150 to the parity emulator 160 (see FIG. 1) via the line 162. These control signals enable the parity emulator 160 to provide the proper timing so that the appropriate parity bit is generated for the appropriate data output over the data bus 156. Although the parity emulator 160 is depicted in FIGS. 1 and 2 as being external to the SIMM 150, it should be understood that the parity emulator 160 could be implemented as a part of the SIMM 150.

In operation, address and control signals are provided to the DRAM chips 202–216 via the address and control buses 152, 154. When the cycle initiated is a write cycle, data is also provided to the inputs of the DRAM chips 202–216 over respective input data lines 222–236 which connect to the data bus 156. Thus the data present at the inputs 222–236 is stored at the memory locations designated by the address data. During a read cycle, however, data is output from memory locations accessed within the DRAM chips 202–216 over the respective data lines 222–236.

Figure 3:
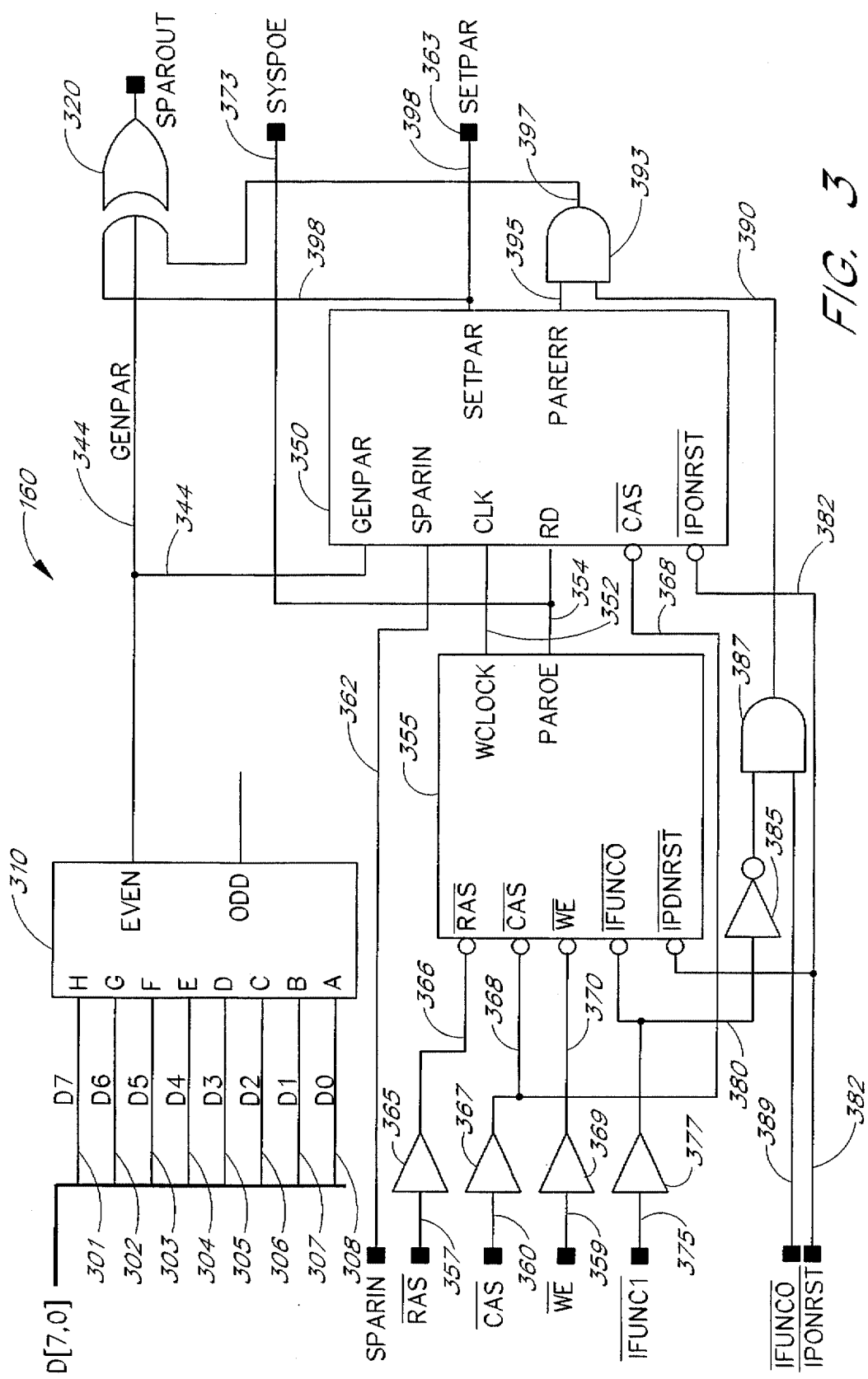
FIG. 3 is a schematic block diagram which details the logic circuitry contained within the parity bit emulator of FIG. 1.

FIG. 3 is a schematic block diagram which shows the internal logic circuitry of the parity emulator 160 of FIG. 1. The parity bit emulator 160 includes input lines 301–308 taken from the data bus 156 which connect to an eight-bit parity generator 310. The eight-bit parity generation circuit 310 outputs a value indicative of the number of ones contained within the data byte applied to the data input terminals 301–308. The logic circuitry used to implement the eight-bit parity generator 310 is depicted in detail in FIG. 5.

The parity circuit 310 has an "even" and an "odd" output which, respectively, output a data bit indication of the parity of the input data byte in terms of even or odd parity. In the embodiment depicted in FIG. 3, the even output of the parity circuit 310 connects to an input of a three-input EXCLUSIVE-OR gate 320, while the odd output of the parity circuit 310 remains unconnected. The even output of the parity circuit 310 also connects to a generated parity input of a parity status circuit 350 via a line 344.

Figure 4:
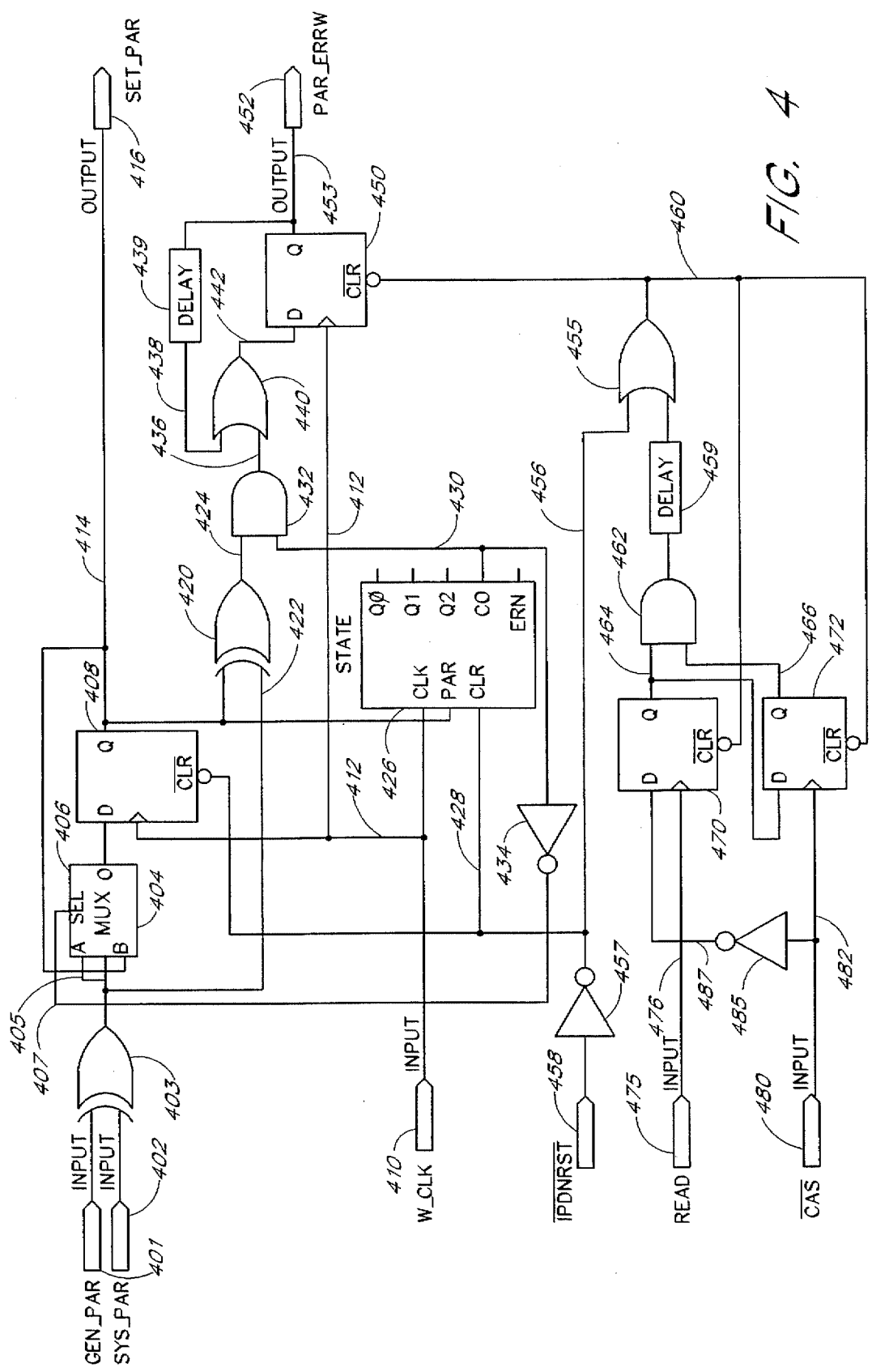
FIG. 4 is a schematic block diagram showing the internal logic circuitry of a parity status circuit shown in FIG. 3.

The internal logic circuitry of the parity status circuit 350 is depicted in FIG. 4 and will be discussed in greater detail below. The parity status circuit 350 receives clock and read input signals via lines 352, 354 from a read/write timing circuit 355. The read/write timing circuit 355 will be described in greater detail below with reference to FIG. 6.

Active low row address strobe (RAS) and write enable (WE) signals serve as inputs to the read/write timing circuit 355 via lines 357, 359, buffers 365, 369, and lines 366, 370, respectively, while an active low column address strobe (CAS) signal serves as an input to both the read/write timing circuit 355 and the parity status circuit 350 via a line 360, a buffer 367, and a line 368. A system parity input (SPARIN) signal is provided as an input to the parity status circuit 350 via a line 362. The system parity input connects to the line on the data bus 156 which carries the parity bit associated with incoming data on the lines 310–308. Finally, an active-low, power-on reset signal is input to the parity status circuit 350 via a line 382. The power-on reset signal resets the parity status circuit 350 to a known state at the time the system 100 is first turned on.

The read/write timing circuit 355 also receives active-low, power-on reset signal as an input via the line 382. In addition, a first function select signal is provided as an input to the read/write timing circuit 355 via a line 375, a buffer 377, and a line 380.

The line 380 also serves as an input to an inverter 385 having an output which connects to an input of a two-input AND gate 387. The other input of the two-input AND gate connects to a second function select input terminal via a line 389. The output of the AND gate 387 connects to an input of an AND gate 393. As will be discussed in greater detail below, the first and second function select inputs, together with the inverter 385 and the AND gate 387, together comprise a function select circuit used to select the function of the parity emulator circuit 160. The other input of the AND gate 393 connects to a parity error flag output of the parity status circuit 350 via a line 395. The output of the AND gate 393 connects to another input of the three-input EXCLUSIVE-OR gate 320 via a line 397.

In addition to providing the parity error flag signal as an output, the parity status circuit 350 also outputs a set parity signal via line 398 which is output via an output terminal 363 and connects to the remaining input of the EXCLUSIVE-OR gate 320.

In general operation, the parity emulator 160 receives an 8-bit data signal via the data bus 156, and generates a parity bit which is appropriate to designate the number of ones within the data byte based upon the predetermined system parity.

If the system parity has not yet been determined by the parity emulator 160, the parity emulator 160 monitors the first four write cycles to determine the associated parity with each of the signals written to the SIMM 150 (see FIG. 1) and sets the system parity on the fourth write cycle. Specifically, as will be described in greater detail below with reference to FIG. 4, circuitry within the parity status circuit 350 is used to monitor the first four write cycles to determine the parity type (i.e., even or odd) associated with each input data byte. If all of the first four write cycles indicate a consistent parity type, then the system parity will be set to the determined parity type after the fourth write cycle. However, if not all of the write cycles are consistent, the parity emulator circuit 160 will continue to monitor write cycles until four consecutive write cycles indicate the same parity type. Once four consecutive write cycles indicate the same parity type, the parity emulator circuit 160 sets its own parity to match the determined system parity type.

Finally, in accordance with the teachings of the preferred embodiment, the parity emulator 160 monitors each write cycle performed by the computer system 100 to determine if the parity bit associated with data written from the CPU 110 to the SIMM 150 is the appropriate parity bit for that data byte. As used herein, the appropriate parity bit for a given data byte means that the parity bit correctly indicates the number of data 1's contained in the data byte in accordance with the system parity (e.g., an even number of 1's results in a parity bit of "1" when the system parity is determined to be even, and a parity bit of "0" when the system parity is determined to be odd). If a monitored parity bit happens to be incorrect for a given data byte, then the parity emulator 160 sets an error flag which is used to generate an intentionally erroneous parity bit (i.e., an inappropriate parity bit) at the next read cycle. In this manner, the parity emulator is able to "generate" an interrupt via the parity check circuit 170 when this circuit detects the erroneous parity bit on the occurrence of the next read cycle. This indicates to the CPU 110 that a data error was introduced at some point along the data transmission passed between the CPU 110 and the SIMM 150. Thus, the CPU 110 may take the appropriate action to correct the error.

More specifically, with respect to the circuitry depicted in FIG. 3, the parity bit emulator 160 receives data from the data bus 156 via the input terminals 301–308. The 8-bit parity circuit 310 generates an output signal which is indicative, in even parity format, of the number of 1s within the eight data bits supplied at the inputs of the parity circuit 310.

Figure 5:
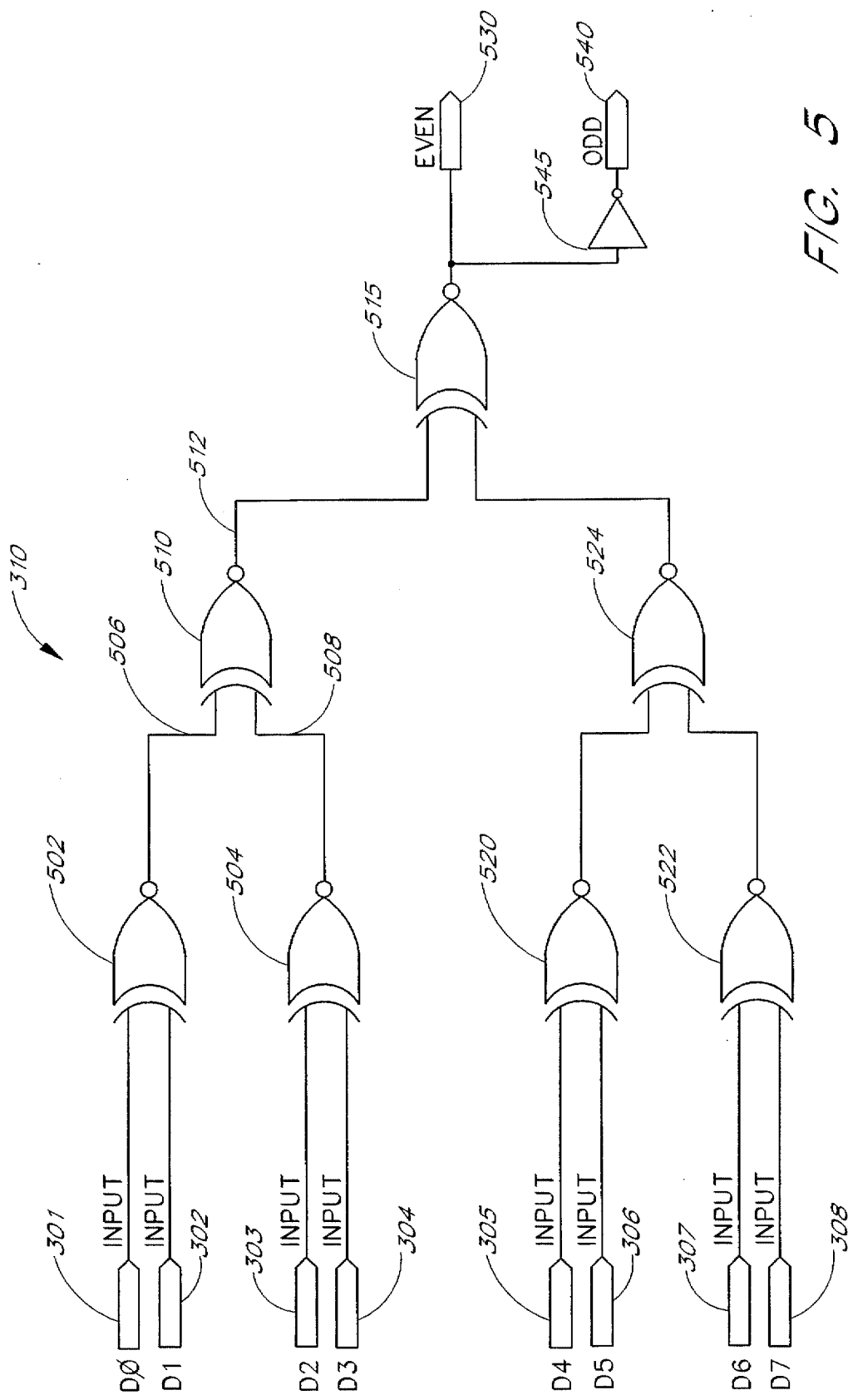
FIG. 5 is a logic diagram representing the internal circuitry of an eight-bit parity determination circuit which is used to determine if even or odd parity is employed in accordance with the preferred embodiment.

As shown in FIG. 5, the parity circuits 310, 315 may be simply implemented by a pair of three-EXCLUSIVE-NOR gate configurations wherein the outputs of two, two-input EXCLUSIVE-NOR gates serve as inputs to a third two-input EXCLUSIVE-NOR gate. The outputs of the pair of three-EXCLUSIVE-NOR gate configurations serve as inputs to a last, two-input EXCLUSIVE-NOR gate. Thus, the circuits 310 outputs a data 1 when there are an even number of 1s within the input data, and a 0 when the number of 1s within the input data is odd. Thus, the output of the EXCLUSIVE-NOR gate 330 will represent even parity.

The output signal indicative of the number of data 1s (in even parity) present on the input terminals 301–308 is provided as a first input to the EXCLUSIVE-OR gate 320. The second input to the EXCLUSIVE-OR gate 320 is provided by the set parity output of the parity status circuit 350 via the line 398. The set parity signal output via the line 398 indicates whether the overall system parity is even or odd. If the overall system parity is even, then a 0 is output by the circuit 350 via the line 398 so that (assuming for the present, that the remaining input over the line 397 is a 0) the EXCLUSIVE-OR gate 320 passes the value input from the parity circuit 310 (i.e., the output of the gate 320 is the same as the output of the parity circuit 310). However, if it is determined within the parity status circuit 350 that the system parity is odd, then a 1 is output over line 398 so that the output of the EXCLUSIVE-OR gate 320 is the inverse of the signal applied to the first input of the EXCLUSIVE-OR gate 340. The manner in which the parity status circuit 350 determines whether or not the system parity is odd or even will be described in greater detail below with reference to FIG. 4.

The EXCLUSIVE-OR gate 320 further receives a third input from the AND gate 393. Assuming that the first and second function select signals are chosen so that a logical 1 is output by the AND gate 387 (i.e., the first and second function select signals are, respectively, 0 and 1), then the output of the AND gate 393 outputs the same signal as the parity error flag output of the parity state circuit 350. Thus, while the function select is set to select the parity emulation function, the EXCLUSIVE OR gate 320 receives the parity error flag signal via the line 397.

The third input of the EXCLUSIVE-OR gate 320 is used to generate an intentionally erroneous parity bit during a read cycle in the event that a parity error was detected in a preceding write cycle. The third input to the EXCLUSIVE-OR gate 320 provided via the line 397 allows for the alteration of the parity setting, which is determined at the first write cycle input. That is, if it is determined by the parity status circuit 350 that the parity associated with a data byte in a preceding write cycle was erroneous, the parity status circuit 350 asserts the parity error signal via the line 395, which causes the output of the AND gate to go high so that the output of the EXCLUSIVE-OR gate 320 is the inverse of the output that normally would be provided by the EXCLUSIVE-OR gate 320 (i.e., if the output of the EXCLUSIVE-OR gate 320 is set to indicate that the system parity is odd, then, upon the activation of the parity error signal, the output of the EXCLUSIVE-OR gate 320 will indicate that the system parity is even). Thus, the parity emulator circuit 160 will generate an intentionally erroneous parity at the next read cycle so that the parity check circuit 170 will interrupt the operation of the CPU 110 to indicate an error. In this manner, the data written from the CPU 110 to the SIMM 150 is monitored during each write cycle to insure accurate data transfer and storage. The operation of the parity status circuit 350 with respect to the determination of system parity will be described in greater detail below with reference to FIG. 4.

When the parity emulation circuit is used to monitor the parity associated with each write cycle, the data byte which is written to the SIMM 150 is applied to the inputs 301–308, while the parity bit associated with the byte of data which is being written to the SIMM 150 is input via the line 362 to the parity status circuit 350. The parity status circuit 350 reads the parity bit associated with the write data applied to the terminals 301–308 and compares the input parity bit with the output of the parity circuit 310. If the input system parity bit is different than the output of the parity circuit 310, then this indicates that the system parity is odd, while if the system parity bit is the same as the output of the parity circuit 310, then this indicates that the system parity is even. As will be described in greater detail below, the set parity output of the parity status circuit 350 is then set to 0 if the system parity is even, and is set to 1 if the system parity is odd.

The parity status circuit 350 further includes timing circuits responsive to an input clock signal via the line 352 which determines when the first four write cycles have transpired. During these initial four write cycles, the parity status circuit 350 monitors the system parity indicated in each of the data writes, and if a discrepancy is found, timing circuit is reset until four consecutive write cycles are detected wherein the same parity type is indicated in all four write cycles. Once four consecutive write cycles have occurred without observing a change in system parity, then the set parity signal output via the line 398 is permanently set to 0 (in the case where an even system parity is observed) or 1 (in the case where an odd system parity is observed).

During both write and read cycles, the timing circuit 355 receives the RAS, CAS, and WE signals via the control bus 162 from the SIMM 150. These signals help to establish the timing within the parity bit emulator 160 so that the appropriate parity bit is assigned to the corresponding data byte applied to the input of the parity bit emulator 160. Thus, the timing circuit 355 generates a write clock signal and a parity output enable signal via lines 352, 354, respectively. The write clock and output enable (or read) signals which enter the parity status circuit 350 are used within the parity status circuit 350, together with the CAS signal, to determine when the system parity parameter of the parity bit emulator 160 is to be set and also to determine when a parity error is encountered during one of the initial system parity set cycles. The operation of the read/write timing circuit 355 in conjunction with the parity status circuit 350 will be described in greater detail below with reference to FIGS. 4 and 6. In this manner, the circuit of FIG. 3 is implemented as a parity emulator which is capable of monitoring data writes to the SIMM 150 and insuring that an interrupt is generated when an error is detected in data written to the SIMM 150.

As discussed briefly above, the circuit of FIG. 3 includes a function select circuit which determines the operation of the circuit 160 based upon four possible combinations of the first and second function select signals via the lines 375, 389. Specifically, when the input to the line 375 is logical 1, while the input to the line 389 is logical 0, this selects the parity emulator function so that the circuit 160 operates as described above. Although not discussed herein for purposes of simplicity of illustration of the invention, other valid combinations of the first and second function select signals result in the selection of memory controller, block decoder, and ECC decoder functions.

FIG. 4 is a schematic block diagram which shows the internal logic circuitry of the parity status circuit 350 of FIG. 3. As shown in FIG. 4, a bus parity input terminal 401 as well as a system parity input terminal 402 respectively connect as first and second inputs of an EXCLUSIVE-OR gate 403. The bus and system parity input terminals 401, 402 connect to the lines 344, 362, respectively (see FIG. 3). The output of the EXCLUSIVE-OR gate 403 connects to a multiplexer 404 at a first input 405. The output of the multiplexer 404 connects, via a line 406, to an input of a D-flip-flop 408. The D-flip-flop 408 acts as a latch to propagate the output of the multiplexer 404 to the Q-output of the D-flip-flop 408 after a one-clock-cycle delay. The multiplexer 404 receives a select input via a line 407. The D-flip-flop 408 receives a clock input from a write clock input 410 via a line 412. The write clock input 410 connects to the line 352 (FIG. 3). The Q-output of the D-flip-flop 408 propagates to a SET PARITY output 416 via a line 414. The output line 414 also feeds back to a second input of the multiplexer 404. The output terminal 416 connects to the line 398 of FIG. 3. The output of the D-flip-flop 408 further connects to a first input of an EXCLUSIVE-OR gate 420 and also to a parity input of a state machine 426 via the line 414. The EXCLUSIVE-OR gate 420 further receives a second input via a line 422 which connects to the output of the multiplexer 404.

The output of the EXCLUSIVE-OR gate 420 connects to a first input of an AND gate 432 via a line 424. The second input of the AND gate 432 connects to a carry-over output of the counter 426. The carry-over output of the counter 426 further connects to the select input 407 of the multiplexer 404 via an inverter 434. The output of the AND gate 432 connects to a second input of an OR gate 440 via a line 436. The first input of the OR gate 440 is received via a line 438 and a delay circuit 439, which connects to an output of a D-flip-flop 450. The D-flip-flop 450 receives a D-input from the output of the OR gate 440 via line 442 and a clock input from the write clock input terminal 410 via the line 412. The Q-output of the D-flip-flop 450 connects to a parity error flag output terminal 452 via line 453. The output terminal 452 connects to the line 395 of FIG. 3.

The clear input for the D-flip-flop 450 connects to an output of an OR gate 455 via a line 460. The OR gate 455 receives a first input from an output of an inverter 457 via a line 456. The line 456 also connects to clear inputs of the counter 426 and the D-flip-flop 408. The input of the inverter 457 connects to a power-on reset terminal 458 which connects to the line 382 of FIG. 3. A second input of the OR gate 455 connects to the output of an AND gate 462 via a delay circuit 459.

The AND gate 462 receives first and second inputs from the outputs of D-flip-flops 470, 472 via lines 464, 466, respectively. The D-flip-flop 472 receives a clock input from a READ input terminal 475 via a line 476. The READ input terminal 475 connects to the parity output enable of the timing circuit 355 via the line 354 (FIG. 3). The D-input of the D-flip-flop 470 connects to a CAS input terminal 480 via a line 482, an inverter 485 and a line 487. The CAS input terminal also supplies the clock input to the D-flip-flop 472, and connects to the line 368 (FIG. 3). The D-input of the D-flip-flop 472 connects to the output of the flip-flop 470 via the line 464. The clear inputs of the D-flip-flops 470, 472 connect to the output of the OR gate 455 via the line 460.

The parity signal generated by the parity circuit 310 (FIG. 3) is applied to the input terminal 401 while the system parity bit supplied via the line 362 is applied to the input terminal 402. The EXCLUSIVE-OR gate 403 compares the generated parity with the system parity so that if the generated parity is the same as the system parity (i.e., the system parity reflects an even system parity), then the output of the EXCLUSIVE-OR gate 403 will be a zero while if the generated parity differs from a system parity (i.e., the system parity reflects an odd system parity), then the output of the EXCLUSIVE-OR gate 403 will be a 1. The output of the EXCLUSIVE-OR gate 403 is provided along the line 405 to the first input over the multiplexer 404. During the initial setup of the multiplexer 404, the input provided along the line 405 is selected so that signals input along the line 405 are propagated to the output of the multiplexer 404 along the line 406 to the input of the D-flip-flop 408. Thus, for example, if the generated parity is different from the received system parity, a 1 will be output by the EXCLUSIVE-OR gate 403 and this 1 will be propagated to the input of the D-flip-flop 408 via the multiplexer 404. At the next write cycle initiated by the write clock applied at the terminal 410, the D-flip-flop 408 will latch the signal applied at the input to be output at the set parity terminal 416 via the line 414.

At each pulse of the write clock applied at the input terminal 410, the state counter 426 is incremented so that after four consecutive write cycles, the carry-over (also known as a carry-out) output of the counter 426 goes high. The assertion of the carry-over output of the counter 426 causes a select signal to be applied at the select input of the multiplexer 404 via the line 407 and the inverter 434. Thus, once the carry-over output is asserted on the line 430, this causes the multiplexer 404 to switch from the first input on the line 405 to the second input provided along the line 414. Since the line 414 connects directly to the SET PARITY output terminal 416 and to the output of the D-flip-flop 408, the second input of the multiplexer 404 will remain the same as the output provided on the set parity terminal 416 until a system reset occurs. In this manner, the parity status circuit 350 sets the system parity after four consecutive write cycles have occurred.

The following example will help to illustrate the method by which the parity status circuit 350 sets the system parity after four consecutive write cycles. If the generated parity applied to the input terminal 401 is different from the system parity applied to the input terminal 402, then the EXCLUSIVE-OR gate 403 outputs a logic high signal (i.e., a logical 1) which is propagated via the multiplexer 405 to the input of the D-flip-flop 408. Upon the application of a write pulse, the D-flip-flop 408 outputs the logical 1 onto the line 414 thereby causing the SET PARITY signal to be set to 1 (that is, the system parity is set to odd). Assuming no errors occur in the first four consecutive write cycles, the same process occurs in each of the next three write cycles until the carry-over output of the counter 426 is asserted. Of course, it should be understood that the counter 426 could be constructed so as to provide a carry-over output after two, three, four, or more consecutive write cycles. Once the carry-over output is asserted, the carry-over signal initiates a select of the multiplexer 404 so that the multiplexer 404 passes inputs from the second input (i.e., the input connected to line 414) to the output of the multiplexer 406. In this manner, the SET PARITY signal is back propagated to the input of the D-flip-flop 408 so that at each subsequent write cycle the same SET PARITY signal will be output by the D-flip-flop 408. Once a reset occurs (e.g., when the power-on reset signal is applied to the input terminal 458), then the output of the D-flip-flop 408 is cleared as is the state of a counter 426 so that the system parity set procedure is repeated each time the computer processing system 100 is turned on.

Although unlikely, it is possible that during one of the initial four consecutive write cycles which are monitored to set the system parity, a parity error occurs so that the system parity might be inaccurately set. For this reason, the parity status circuit 350 includes error detection circuitry which insures that the system parity is set to the correct parity despite the presence of parity errors in the initially monitored write cycles.

Specifically, the output of the D-flip-flop 408 connects to a reset input of the counter 426 so that when the output of the D-flip-flop 408 changes, the counter 426 is reset to zero. As described above, the system parity is not set until the counter 426 asserts an active high carry-out signal on the line 430. Therefore, unless four consecutive write cycles occur wherein the same system parity is detected in each consecutive write cycle, the counter 426 will not assert the carry-over signal. Thus, the counter 426 insures that a system parity is not set until four consecutive write cycles which have the same system parity are detected.

The parity status circuit 350 further includes circuitry to set an error flag when an error is detected in the system parity after the system parity has been set within the parity status circuit 350. As discussed briefly above, every write cycle is monitored after the system parity is set within the parity status circuit 350 to determine if a parity error has occurred. That is, if the detected data bits applied to the input terminal 301 through 308 indicate that the parity bit applied on the system parity input terminal 362 (FIG. 3) is incorrect, this indicates that a parity error has occurred. To determine if a parity error has occurred, the EXCLUSIVE-OR gate 420 receives an input over the line 414 which indicates the system parity and compares this input with the signal applied over the line 422 which is indicative of the parity bit associated with the data written during the monitored write cycle. If the system parity indicated by the signal present on the line 414 differs from the parity signal present on the line 422, then this indicates that an error in the system parity has occurred. Thus, the EXCLUSIVE-OR gate 420 outputs the logical high signal via the line 424 to the first input of the AND gate 432. The AND gate 432 receives a second input signal via the line 430 from the carry-out output of the counter 426. If the counter 426 has not yet asserted the carry-out signal, then this indicates that the parity status circuit 350 has not yet set a system parity so that a parity error flag should not be asserted. However, if a carry-over signal is generated by the counter 426, then the signal output by the EXCLUSIVE-OR gate 420 is propagated through the AND gate 432 to the first input of the OR gate 440 via the line 436. When a logical 1 is applied to the input 436 of the OR gate 440, this logical 1 is propagated via the line 442 to the input of the D-flip-flop 450. The D-flip-flop 450 subsequently passes this logical 1 to the output parity error flag terminal 452 via the line 453 upon the application of the next clock pulse at the input terminal 410. In this manner, once the initial system parity has been set after four consecutive write cycles, the parity status circuit 350 generates a parity error flag on the output terminal 452 when a parity error is detected.

It should be observed that the parity error flag remains set until the next read cycle is asserted. As discussed above, the parity emulator circuit 160 (FIGS. 1 and 3) generates an intentionally inappropriate, (i.e. erroneous) parity bit at the first read cycle which follows a detected parity error during a monitored write cycle. Thus, the parity flag remains set until the first read cycle is observed, whereupon the parity error flag is used to generate the erroneous parity bit and is then reset to low (i.e., 0).

Specifically, after a parity error signal is detected, the output terminal 452 is high and this signal is back propagated through the delay circuit 439, having a delay of approximately five nanoseconds for timing purposes, to an input of the OR gate 440 via the line 438. The OR gate 440 then propagates this high signal via the line 442 back into the input of the D-flip-flop 450 so that the output of the D-flip-flop 450 remains active high until a clear signal is received via the line 460. The clear signal generated via the line 460 may occur when the power-on reset signal is asserted on the input terminal 458, or, if the appropriate combination of READ and CAS signals are applied on the terminals 475, 480, respectively. Thus, if a column address strobe signal applied at the input terminal 480 is toggled while the READ input applied at the input terminal 475 is asserted, this causes an active high signal to be applied at the input of the D-flip-flop 470 and, propagated to the output of the D-flip-flop 470 to be applied at the input of the D-flip-flop 472. Once a CAS signal is toggled again, this propagates the active high signal applied to the input of the D-flip-flop 472 to the output of the D-flip-flop 472 so that active high signals are applied to both inputs of the AND gate 462. Thus, the output of the AND gate 462 is an active high signal which is provided via the delay circuit 459, having a delay of approximately 5 nanoseconds for timing purposes, to the input of the OR gate 455. Thus, when the appropriate combination of read and CAS signals are applied at the input terminals 475, 480, this causes the D-flip-flop 450 to reset so that the parity error flag is reset.

Thus, the parity error flag is reset whenever a power up occurs within the system 100 or upon the occurrence of the first read cycle initiated after a parity error is detected.

FIG. 5 depicts the internal logic circuitry of the parity circuit 310 shown in FIG. 3. As shown in FIG. 5, the data input terminals 301, 302 respectively connect the first and second inputs of an EXCLUSIVE-NOR gate 502, while the data inputs 303, 304 respectively connect to first and second inputs of an EXCLUSIVE-NOR gate 504. The outputs of the EXCLUSIVE-NOR gates 502, 504 respectively connect to first and second inputs of an EXCLUSIVE-NOR gate 510 via lines 506, 508. The output of the EXCLUSIVE-NOR gate 510 connects to an input of an EXCLUSIVE-NOR gate 515 via a line 512.

EXCLUSIVE-NOR gates 520, 522, and 524 connect input terminals 305-308 to a second input of the EXCLUSIVE-NOR gate 515 in similar fashion. The output of the EXCLUSIVE-NOR gate 515 connects to an EVEN parity output terminal 530, and to an ODD parity output terminal 540 via an inverter 545. The terminal 530 connects to the line 344 (FIG. 3), while the output terminal 540 is shown in FIG. 3 as disconnected. Thus, the signal output at the terminal 530 indicates, in even parity, the number of 1s present out of the eight data input terminals 301-308. That is, if an even number of 1s are applied to the input terminals 301-308, then the output terminal 530 will have an output of 1; while if an odd number of 1s is applied to the input terminals 301-308, then the output terminal 530 will have an output of 0.

Figure 6:
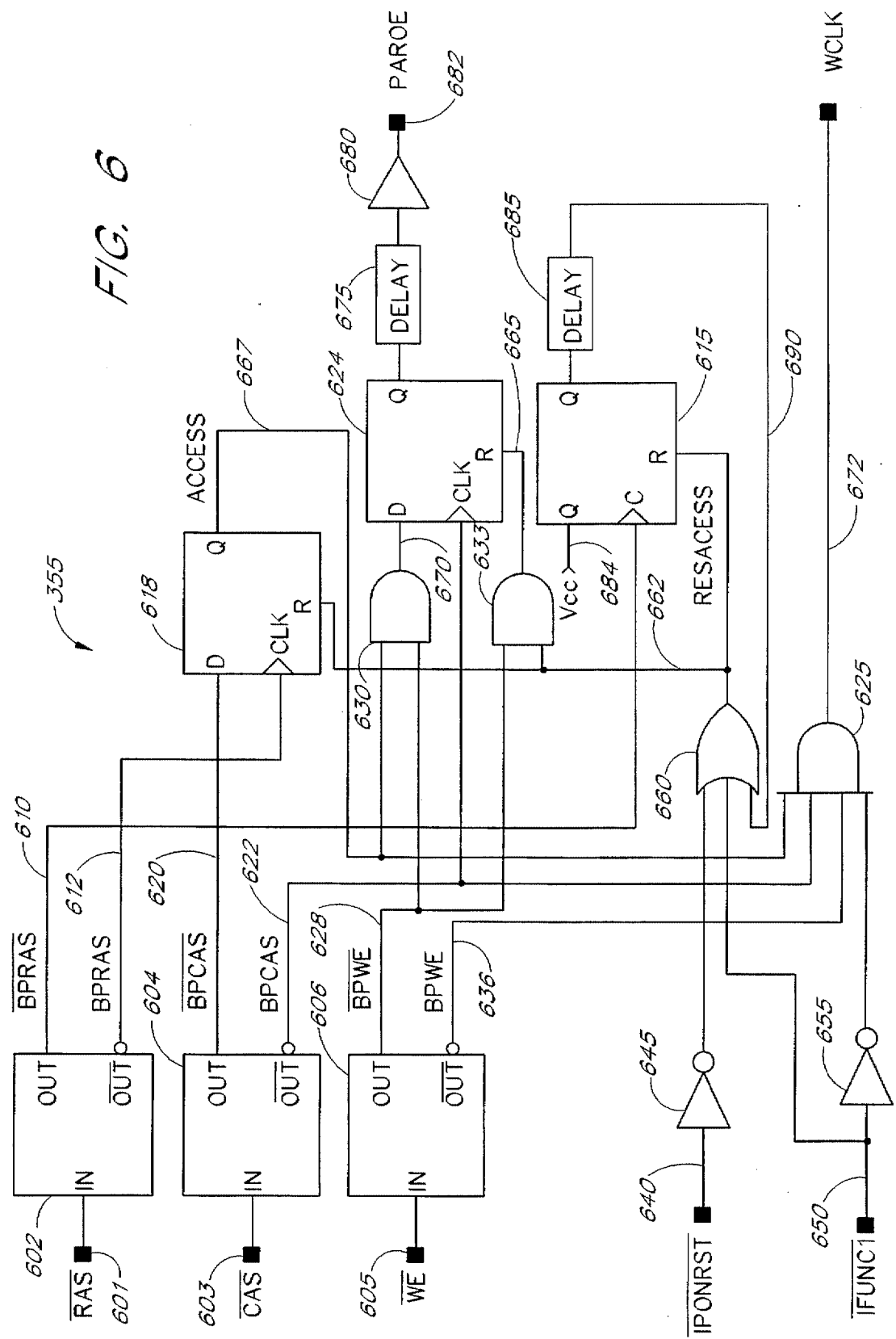
FIG. 6 is a schematic diagram showing the internal logic circuitry of the timing state machine of FIG. 3.

FIG. 6 is a schematic block diagram showing the internal logic circuitry of the read/write timing circuit 355 of FIG. 3. The timing circuit 355 is used to provide the right clock signal and the parity output enable signal which are essential in establishing timing within the parity status circuit 350. As shown in FIG. 6, the RAS, CAS and WE signals, which are all active low as shown in FIG. 6, are applied to input terminals 601, 603 and 605, respectively. The terminals 601, 603 and 605 connect to the lines 357, 360 and 359, as depicted in FIG. 3. The input terminals 601, 603 and 605, respectively enter buffer circuits 602, 604 and 606. Each of the buffer circuits 602–606 provide non-inverting and inverting outputs corresponding to the input signal applied to the input of the buffer circuits 602–606.

The non-inverting output of the buffer 602 connects to a clock input of a D-flip-flop 615 via a line 610, while the inverting output of the buffer 602 connects to a clock input of a D-flip-flop 618 via a line 612. A non-inverting output of the buffer 604 connects to the input of the D-flip-flop 618 via a line 620 while the inverting output of the D-flip-flop 604 connects to a clock input of a D-flip-flop 624 as well as to a first input of a four-input AND gate 625 via a line 622. A non-inverting output of the D-flip-flop 606 connects to a first input of an AND gate 630 as well as a first input of an AND gate 633 via a line 628, while the inverting output of the buffer 606 connects to a second input of the four-input AND gate 625 via a line 636.

The power-on reset signal is applied to an input terminal 640 which connects to the line 382 of FIG. 3. The terminal 640 connects to an input of an inverter 645. The first function select signal is applied at an input terminal 650 which connects to the line 380 of FIG. 3. The input terminal 650 serves as an input to an inverter 655 as well as to an input of a three-input OR gate 660. The three-input OR gate 660 also includes an input connected to the output of the inverter 645.

The output of the OR gate 660 connects to reset inputs of the D-flip-flop 615,618 as well as to an input of the AND gate 633. The output of the AND gate 633 connects to a reset input of the D-flip-flop 624.

The output of the D-flip-flop 618 connects to an input of the AND gate 630 as well as to an input of the four-input AND gate 625 via a line 667. The output of the AND gate 630 connects to an input of the D-flip-flop 624 via a line 670. The output of the D-flip-flop 624 connects to a delay circuit 675 which, in turn, connects to the parity output enable terminal 682 via a buffer 680. The parity output enable terminal 682 connects to the line 354 of FIG. 3.

An input of the D-flip-flop 615 connects to VCC (i.e., a constant, active-high, voltage signal) via a line 684. The output of the D-flip-flop 615 connects to a delay circuit 685, which, in turn, connects to the remaining input of the three-input OR gate 660 via a line 690.

In operation, the active-low RAS, CAS and WE signals applied to input terminals 601, 603, and 605, are indicative of the timing used to access the SIMM 150 (see FIGS. 1 and 2) during read and write cycles. For example, FIGS. 7a and 7b respectively show the timing relations of address, data and control signals used to access the SIMM 150 during read and early write cycles. It should be noted here that the preferred embodiment is designed to operate primarily in a system which generates only early write cycles. The operation of the timing circuit 355 of FIG. 6 will be illustrated in an example with reference to FIG. 7a and 7b below.

Figure 7A:
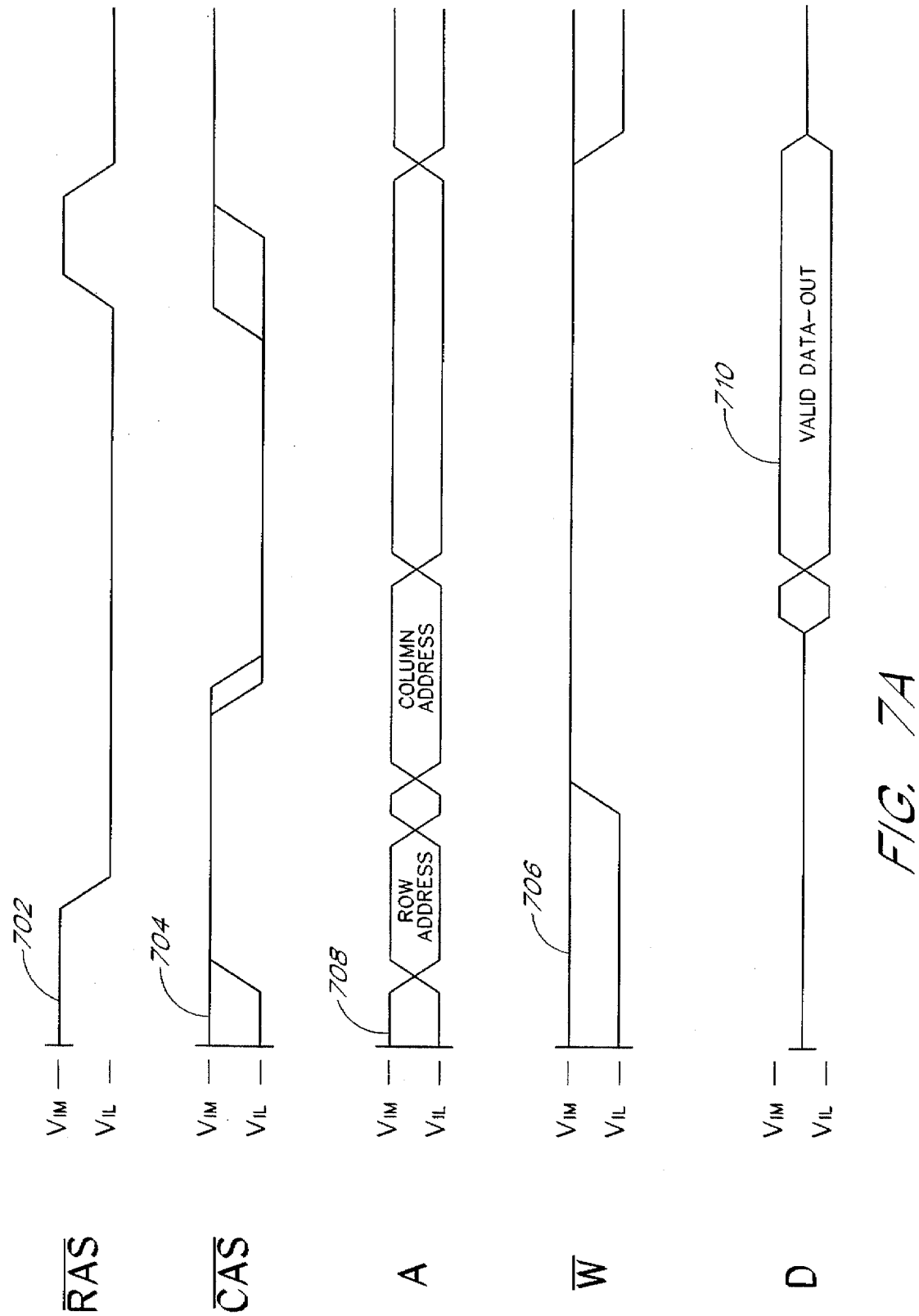

As shown in FIG. 7a, an active-low RAS signal 702, an active-low CAS signal 704, an active-low WE signal 706, and address and data signals 708, 710 are used when accessing the SIMM 150 during a read cycle. In like manner, these same signals are used to access the SIMM 150 during a write cycle as depicted in FIG. 7b. The difference in the relative timings between the control and address signals of FIG. 7a and 7b will be described in greater detail below.

Within the early write cycle, the RAS signal 702 is asserted to indicate that a valid row address is applied to the SIMM 150 (FIGS. 1 and 2). When the RAS signal is applied to the input terminal 601, this causes the buffer 602 to output an inverted RAS signal over the line 612. The inverted RAS signal on the line 612 serves as a clock signal input to the D-flip-flop 618. Since each of the D-flip-flops 618, 624, 615 of FIG. 6 are positive transition flip-flops (i.e., the input is latched to the output of the flip-flop whenever a transition from a low voltage to a high voltage is observed at the clock input) the assertion of the inverted RAS signal on the line 612 causes the input of the D-flip-flop 618 to be latched to the output of the flip-flop 618. Specifically, as shown in FIG. 7a, at the time that the RAS signal 702 transitions from an active to active the CAS signal 704 applied to the input terminal 603 and, consequently to the input of the D-flip-flop 618 via the buffer 604 and the line 620, is at a high voltage level.Thus, at the time that the RAS signal 702 transitions, a logical 1 is propagated from the input of the D-flip-flop 618 to the output of the D-flip-flop on the line 667. The signal provided at the output of the D-flip-flop 618 is the access signal which indicates that a memory access has been initiated.

The high voltage signal on the line 667 at the output of the D-flip-flop 618 is applied to the first input of the AND gate 630 and remains high until at least the next transition of the RAS signal applied to the clock input of the D-flip-flop 618. Thus, when the write enable signal applied to the input terminal 605 causes a high voltage level to be output to the second input of the AND gate 630 via the line 628, the output of the AND gate 630 becomes a logical 1 on the line 670. Once the CAS signal transitions at the clock input of the D-flip-flop 628, this causes the high voltage applied at the input of the D-flip-flop 624 to latch to the output of the flip-flop 624. This high voltage level output of the D-flip-flop 624 is propagated to the parity output enable terminal 682 via the delay circuit 675 and the buffer 680.

Once the RAS signal buffered out to the line 610 transitions back to a high voltage level as applied to the clock input of the D-flip-flop 615, this causes the high voltage level (i.e., VCC) applied at the input of the flip-flop 615 to be latched to the output of the flip-flop 615. Thus, a high voltage level propagates to an input of the OR-gate 660 via the delay circuit 685. So long as any one of the three inputs of the OR-gate 660 is a high voltage level, the output of the OR-gate 660 on the line 662 will assume a high voltage state. This causes the D-flip-flop 615, 618 to reset immediately, and if the write enable signal output over the line 628 is unasserted (i.e., is at a high voltage level), then the D-flip-flop 624 is also reset due to the high voltage on the line 665 propagated through the AND gate 633. In this manner each of the D-flip-flops 615, 618, and 624 are reset during the normal course of operation of the timing circuit 355 of FIG. 6.

Timing circuit reset may also be accomplished by means of the power-on reset signal applied at the input terminal 640 and propagated to the first input of the OR gate 660 via the inverter 645. In addition, if the first function select signal applied at the input terminal 650 has a high voltage state, this would also cause the output of the OR gate 660 to assume a high voltage state so that the D-flip-flop 618 and 615 automatically reset, and the D-flip-flop 624 resets when the write enable signal is inactive.

Finally, the write clock signal is output by the four-input AND gate 625 over the line 672 when the access signal on the line 667, the inverted CAS signal on the line 622, the inverted WE signal on the line 636, and the inverted first function select signal output by the inverter 655 are all high. Thus, the timing circuit 355 outputs parity output enable and write clock signals over the lines 354, 352, respectively (see FIG. 3), in response to the application of the RAS, CAS, WE, power-on reset, and first function select signals at the inputs of the timing circuit 355.

Although the preferred embodiment of the present invention has been described and illustrated above, those skilled in the art will appreciate that various changes and modifications to the present invention do not depart from the spirit or essence of the invention. For instance, the present invention could also be implemented within an application specific integrated circuit (ASIC). The timing circuit could also be adapted for different kinds of read and write cycles. For example, the preferred embodiment could be configured to flag parity errors for consecutive write cycles followed by a read cycle, a single write cycle followed by a read cycle, and a fast page mode write cycle followed by a read cycle. Accordingly, the scope of the present invention is limited only by the language of the following appended claims.

What is claimed is:

1. A parity bit emulator for operation within a computer system having a central processing unit (CPU) and a memory, and wherein transfer of data to said memory constitutes a data write while transfer of data from said memory constitutes a data read, said emulator comprising:

circuitry in communication with said CPU and said memory via a bus wherein said circuitry emulates a parity bit of a first system parity type to be associated with first data transferred along said bus during read cycles and checks parity associated with second data transferred along said bus during write cycles, said circuitry comprising:

a plurality of data inputs which are configured to receive data bits provided by said computer system;

parity bit generation circuitry having inputs which connect to said data inputs and an output which provides an emulated parity bit of said first system parity type in response to the application of said data to said data inputs during a read cycle;

a parity bit input which receives a parity bit associated with said input data bits during a write cycle; and a parity error determination circuit which (a) receives (i) said parity bit and (ii) an output of said parity bit generation circuit during a write cycle and (b) compares said input parity bit and said output of said parity bit generation circuitry to provide an error signal without changing said first system parity type if said input parity bit is different than said output of said parity bit generation circuitry.

2. A parity emulator as defined in claim 1, further including interrupt generation circuitry which causes a system interrupt to occur when said error signal is generated.

3. A parity emulator as defined in claim 1, further including a parity bit modifier circuit connected to said parity error determination circuit which causes said parity bit output by said parity generation circuitry in response to the application of said data to said data inputs during a read cycle to be inappropriate whenever said error signal is active.

4. A method of emulating a parity bit within a computer system having a memory and a predetermined system parity type so that parity bits associated with corresponding sets of data are consistent with said system parity type, and wherein transfers of data to said memory are designated as write cycles and transfers of data from said memory are designated as read cycles, said method comprising the steps of:

monitoring data sets, together with parity bits associated with said data sets, transferred during multiple monitored write cycles;

setting a system parity type of a parity emulator when said multiple monitored write cycles have the same parity type;

observing data sets transferred during read cycles;

generating a parity bit consistent with said system parity type to be associated with each observed data set;

observing data sets, together with parity bits associated with said data sets, transferred during write cycles; and generating an error signal without changing said system parity type when said monitored data sets have an associated parity bit which is not consistent with said system parity type of said parity emulator.

5. The method of claim 4, further comprising the steps of:

monitoring a subsequent data set transferred during a read cycle; and generating a parity bit to be associated with said subsequent data set which is not consistent with said system parity type of said parity emulator.

6. A method as defined in claim 5, wherein said error signal comprises an error flag which is set upon the detection of a parity bit which is not consistent with said system parity type of said parity emulator, and which is cleared during a next read cycle.

7. A method as defined in claim 6, wherein said steps of monitoring said data sets comprise monitoring eight-bit data bytes.

8. A computer system comprising:

a central processor unit (CPU);

a memory unit, said CPU and said memory unit exchanging data during read and write cycles, at least some of said data being parity encoded in accordance with a pre-defined system parity type; and a parity emulation circuit which connects with said memory unit to receive data transferred to said memory during write cycles, said parity emulation circuit configured to monitor a parity bit associated with data received during write cycles to determine if said parity bit is consistent with said system parity type, wherein said parity emulation circuit includes an error flag generation circuit which generates an error flag without changing said pre-defined system parity type if said parity bit associated with said data received during a write cycle is not consistent with said system parity type.

9. A computer system as defined in claim 8, wherein said parity emulation circuit additionally receives data transferred from said memory unit during read cycles and generates a parity emulation bit consistent with said system parity type during read cycles.

10. A computer system as defined in claim 9, further comprising a parity check circuit which receives data transferred during said read cycles, together with said parity emulation bit associated with said data, and generates an interrupt via an interrupt line in communication with said CPU when said parity emulation bit is not consistent with said system parity type.

11. A computer system as defined in claim 10, wherein said parity emulation circuit further includes circuitry which generates a parity emulation bit which is not consistent with said system parity type when said error flag is set during a read cycle.

12. A computer system as defined in claim 11, wherein said circuitry which generates a parity emulation bit which is not consistent with said system parity type comprises an EXCLUSIVE-OR gate.

13. A parity bit emulator for operation within a computer system having a memory, said computer system having a predetermined system parity type, said emulator comprising:

a plurality of data inputs which are configured to receive data provided by said computer system;

parity bit generation circuitry having inputs which connect to said data inputs and an output which provides an emulated parity bit having said predetermined system parity type in response to the application of said data to said data inputs;

a system parity determination circuit which monitors parity bits associated with data written to said memory during multiple write cycles and outputs a parity set signal when said multiple monitored write cycles are determined to have the same parity type, said system parity determination circuit receiving parity data in subsequent write cycles without changing said parity set signal; and a system parity set circuit in communication with said parity bit generation circuitry, said system parity set circuit receiving said parity set signal to cause parity bits generated by said parity emulator to have the same parity type, such as even or odd, as said parity bits monitored in said multiple write cycles.

14. A parity bit emulator as defined in claim 13, wherein said multiple write cycles are consecutive.

15. A parity bit emulator as defined in claim 13, wherein said system parity set circuit comprises an EXCLUSIVE-OR gate.

16. A parity bit emulator as defined in claim 13, wherein said parity bit generation circuitry consists of EXCLUSIVE-OR gates.

17. A parity bit emulator as defined in claim 13, wherein said system parity determination circuit comprises a counter which is clocked at each write cycle and is reset whenever consecutive write cycles are determined to have a different parity type.

18. A parity bit emulator as defined in claim 17, wherein said counter advances to four consecutive write cycles without a reset before outputting said parity set signal.

19. A parity bit emulator as defined in claim 13, wherein said system parity determination circuit monitors four consecutive write cycles before outputting said parity set signal.

* * * * *